(12) United States Patent
Rensberger et al.

(10) Patent No.: US 8,928,499 B2
(45) Date of Patent: Jan. 6, 2015

(54) INPUT DEVICE WITH MULTIPLE SETS OF INPUT KEYS

(75) Inventors: Gary Rensberger, Redmond, WA (US); Gene Robert Obie, Redmond, WA (US); Mike Franks, Seattle, WA (US); Vincent Ball, Kirkland, WA (US); Steven W. Fisher, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 1695 days.

(21) Appl. No.: 11/627,214

(22) Filed: Jan. 25, 2007

(65) Prior Publication Data

US 2008/0030380 A1  Feb. 7, 2008

(51) Int. Cl.
*G09G 5/08* (2006.01)
*G06F 3/038* (2013.01)
*G06F 3/0354* (2013.01)

(52) U.S. Cl.
CPC .......... *G06F 3/0383* (2013.01); *G06F 3/03543* (2013.01); *G06F 2203/0333* (2013.01); *G06F 2203/0337* (2013.01)
USPC ............... 341/20; 341/22; 345/168; 345/157; 345/163

(58) Field of Classification Search
CPC .................................................. G06F 3/0213
USPC .............. 341/20, 22; 345/168, 172, 157, 163, 345/167, 158
See application file for complete search history.

(56) References Cited

U.S. PATENT DOCUMENTS

| | | | |
|---|---|---|---|
| 4,324,976 A * | 4/1982 | Lapeyre | 235/145 R |
| 5,063,376 A | 11/1991 | Chang | |
| 5,457,480 A | 10/1995 | White | |
| 5,733,056 A * | 3/1998 | Meagher | 400/472 |
| 6,417,840 B1 | 7/2002 | Daniels | |
| 6,466,154 B1 | 10/2002 | Kim | |
| 6,587,094 B2 * | 7/2003 | Anderson | 345/168 |
| 6,842,169 B2 | 1/2005 | Griffin et al. | 345/163 |
| 6,992,656 B2 | 1/2006 | Hughes | |
| 7,030,868 B2 * | 4/2006 | Clapper | 345/204 |
| 7,061,468 B2 | 6/2006 | Tiphane | |
| 7,091,949 B2 | 8/2006 | Hansen | |
| 7,113,173 B1 | 9/2006 | Bi | |
| 7,161,578 B1 * | 1/2007 | Schneider | 345/156 |
| 7,450,031 B2 * | 11/2008 | Wang et al. | 341/26 |
| 7,746,324 B2 | 6/2010 | Gates et al. | 345/169 |
| 8,614,675 B2 | 12/2013 | Rensberger et al. | |
| 2003/0067441 A1 | 4/2003 | Hamana | |

(Continued)

OTHER PUBLICATIONS

Amazon.com "Targus PAWM001U Wireless Optical Mouse/Pointer/Presenter: Electronics" http://www.amazon.com/Targus-PAWM001U-Wireless-Optical-Presenter/dp/B0001GU8MI/ref=dp_return_1/002-8183887-022—Nov. 4, 2006.
Wideaxis Technology "Wireless Control of your PowerPoint Presentations and a Laser Pointer in One Simple Device" http://www.venturaes.com/wideaxis/index1.html, Nov. 20, 2006.
Prosecution Documents associated with U.S. Appl. No. 11/627,210 including: Office Action mailed Aug. 4, 2010, Amendment filed Jan. 28, 2010, Office Action mailed Sep. 29, 2009.
U.S. Appl. No. 11/627,210, filed Jan. 25, 2007.

(Continued)

*Primary Examiner* — Albert Wong
(74) *Attorney, Agent, or Firm* — Jeremy Snodgrass; Judy Yee; Micky Minhas

(57) ABSTRACT

An input device is disclosed that includes keys on a first surface and a second surface of the input device. At least some of the keys are operably coupled to a matrix including a switch for each key therein. When one of the keys is pressed, the corresponding switch is activated to provide a signal indicative thereof.

18 Claims, 6 Drawing Sheets

(56) References Cited

U.S. PATENT DOCUMENTS

| | | | |
|---|---|---|---|
| 2003/0174125 A1 | 9/2003 | Torunoglu | |
| 2003/0201977 A1 | 10/2003 | Hassig | |
| 2005/0057508 A1 | 3/2005 | Kim | |
| 2005/0078087 A1 | 4/2005 | Gates et al. | 345/163 |
| 2005/0128180 A1 | 6/2005 | Wang | |
| 2005/0179647 A1 | 8/2005 | Simmons | |
| 2005/0179658 A1 | 8/2005 | Huang | |
| 2005/0266872 A1* | 12/2005 | MacIntosh et al. | 455/550.1 |
| 2005/0280632 A1 | 12/2005 | Tsan | |
| 2006/0197756 A1 | 9/2006 | Sun | |
| 2006/0244726 A1 | 11/2006 | Wang et al. | 345/163 |
| 2007/0247427 A1* | 10/2007 | Huang et al. | 345/163 |
| 2008/0024448 A1 | 1/2008 | Chang | 345/166 |
| 2008/0030470 A1 | 2/2008 | Rensberger et al. | |
| 2008/0122791 A1 | 5/2008 | Hsu | 345/165 |
| 2009/0021483 A1 | 1/2009 | Hsu | |

OTHER PUBLICATIONS

Prosecution documents associated with U.S. Appl. No. 11/627,210 including: Amendment filed Oct. 12, 2010.

Prosecution Documents associated with U.S. Appl. No. 11/627,210, including: Notice of Allowance Sep. 23, 2013.

Cavens et al. "Interacting with the Big Screen: Pointers to Ponder" University of British Columbia, 2002.

Mini WirelessX-Pointer Wireles PowerPoint Presenation Controller, "Wireless Control of your PowerPoint Presentations and a Laser Pointer in One Simple Device!" http://www.venturaes.com/wideaxis/index1.html.

Bi et al., "uPen: Laser-based, Personalized, Multi-User Interaction on Large Displays" Dept. of Computer Science, Tsinghua University, China 2005.

"Remote control for computer presentations: Teaching & Learning Support Services: The . . . " University of Melbourne, http://www.infodiv.unimelb.edu.au/tss/access/keyspan.html, Nov. 2006.

* cited by examiner

INPUT DEVICE WITH MULTIPLE SETS OF INPUT KEYS

BACKGROUND

There are a number of different input devices that interface with computing devices. These devices provide a mechanism for which a user can interact with a computer. Some of these input devices include remote controls, game controllers, mice, presenting devices, etc. Current input devices can perform one or more tasks for interfacing with a computer. These tasks include moving a cursor, selecting an icon, scrolling through a window, playing media files, and traversing through presentation slides.

The discussion above is merely provided for general background information and is not intended to be used as an aid in determining the scope of the claimed subject matter.

SUMMARY

An input device is disclosed that includes keys on a first surface and a second surface of the input device. At least some of the keys are operably coupled to a matrix including a switch for each key therein. When one of the keys is pressed, the corresponding switch is activated to provide a signal indicative thereof.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
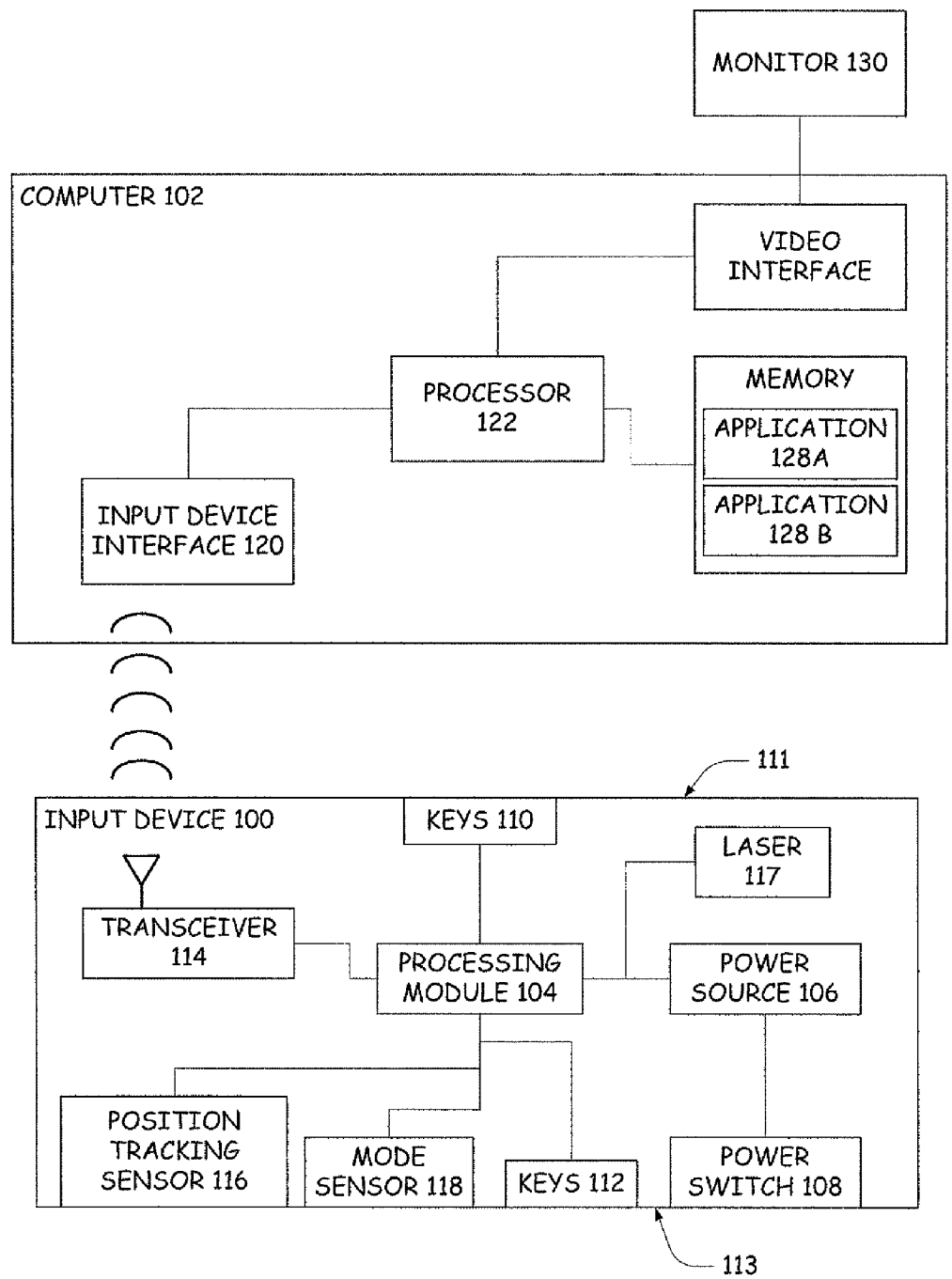
FIG. 1 is a schematic block diagram of an input device and a computer.

FIG. 1 is a block diagram of an input device 100 that interfaces with a computer 102. Input device 100 includes several components for interfacing with computer 102 to perform various tasks. Input device 100 includes a processing module 104 coupled to a power source 106. In one embodiment, power source 106 can include one or more batteries. Alternatively, a cable, such as a USB (Universal Serial Bus) cable, can connect to computer 102 or another power source to provide power to processing module 104. If desired, a power switch 108 can be provided on input device 100 to selectively power on and power off input device 100.

Input device 100 also includes a first set of keys 110 positioned on a top surface 1 of input device 100 and a second set of keys 112 positioned on a bottom surface 113 of input device 100. Keys 110 and keys 112 can be any form of input mechanism such as buttons, wheels, balls, switches, pads, etc. that can be actuated by a user. Although herein illustrated as having two sets of keys 110 and 112, device 100 can also include other keys as desired. Upon actuation of any of the keys 110 and keys 112, processing module 104 provides a signal indicative thereof to a transceiver 114. Transceiver 114 can be any type of wireless and/or wired communication module that transmits signals to computer 102. In one embodiment, transceiver 114 is a Bluetooth® compatible transceiver for wirelessly transmitting signals to and receiving signals from computer 102.

Input device 100 also includes a tracking position sensor 116, a laser 117 and a mode sensor 118. Position tracking sensor 116 can be any type of tracking sensor such as a track ball, optical sensor, etc. Relative movements of input device 100 or portions thereof correspond to movements of a cursor in a plane as detected by position tracking sensor 116. Transceiver 104 can send a signal indicative thereof to computer 102. Laser 117 generates a laser beam used in indicating points of interest, for example when giving a presentation. Such a laser is often referred to as a "laser pointer".

Mode sensor 118 can include one or more sensors for determining a particular mode of input device 100. In one example, mode sensor 118 can be a switch that is actuated by a user to switch from a first mode to a second mode. Alternatively, or in addition to, mode sensor 118 can sense a particular mode automatically, for example, through a pressure sensor, tilt sensor, electromechanical sensor, ultrasound sensor, capacitive sensor, infrared detection sensor, etc. Mode sensor 118 is operative with mode transition logic within processing module 104. Depending upon a particular mode for input device 100, keys 110 and/or keys 112 can be selectively enabled/disabled during operation of input device 100. For example, as discussed below, keys 110 can be enabled in a mouse mode and disabled in a presenter mode. Additionally, position tracking sensor 116 and/or laser 117 can be selectively enabled/disabled depending on the mode.

Computer 102 includes an input device interface 120 that receives signals from input device 100, in particular from transceiver 114. Additionally, computer 102 includes a processing unit 122, memory 124 and a video interface 126. Memory 124 can include one or more applications 128. Additionally, video interface 126 is coupled to a monitor 130 to display images thereon. By operating input device 100, a user can interact with any of the applications 128 and interact with monitor 130.

Figure 2:
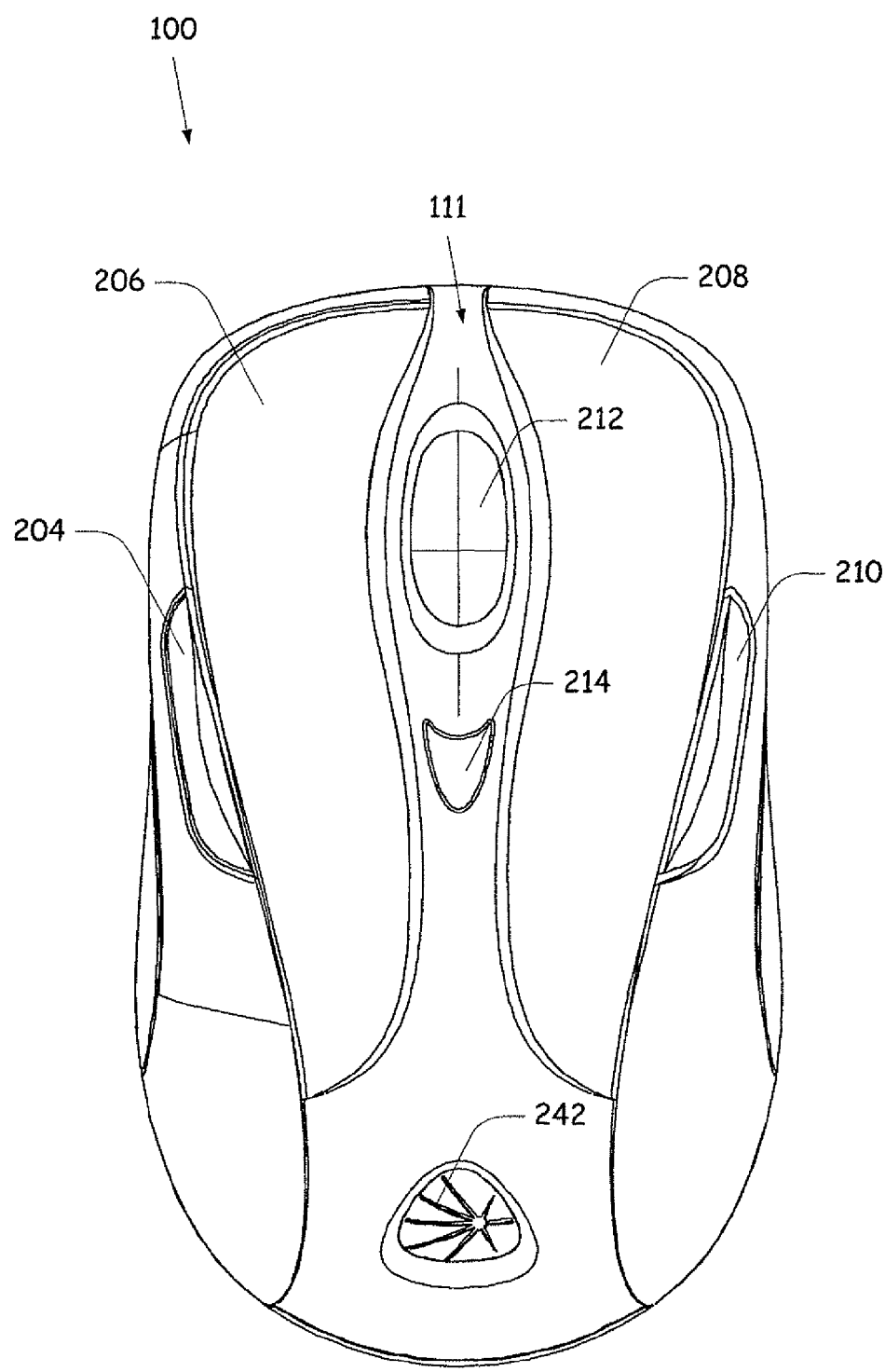
FIG. 2 is a top view of an input device.
Figure 3:
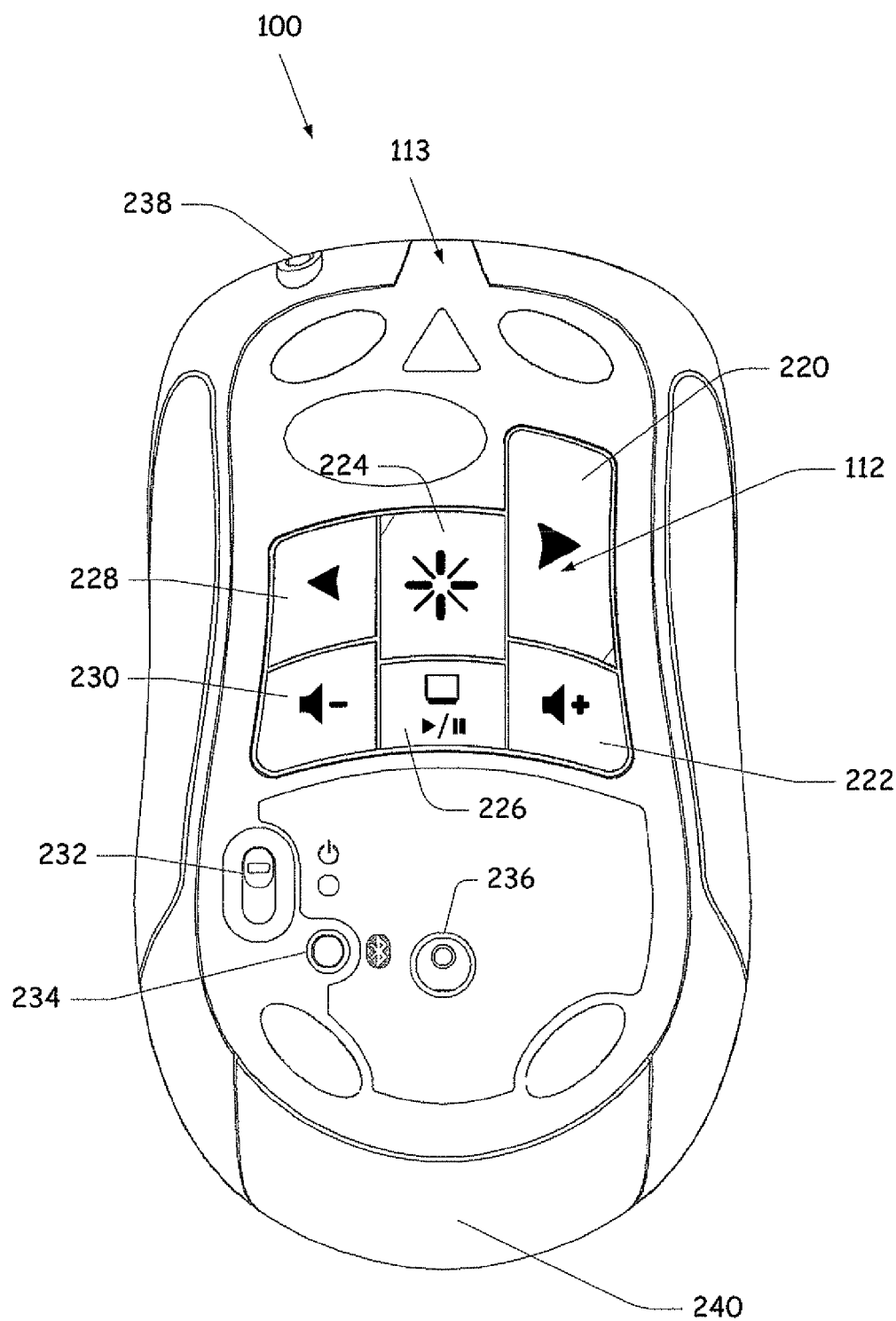
FIG. 3 is a bottom view of an input device.
Figure 4:
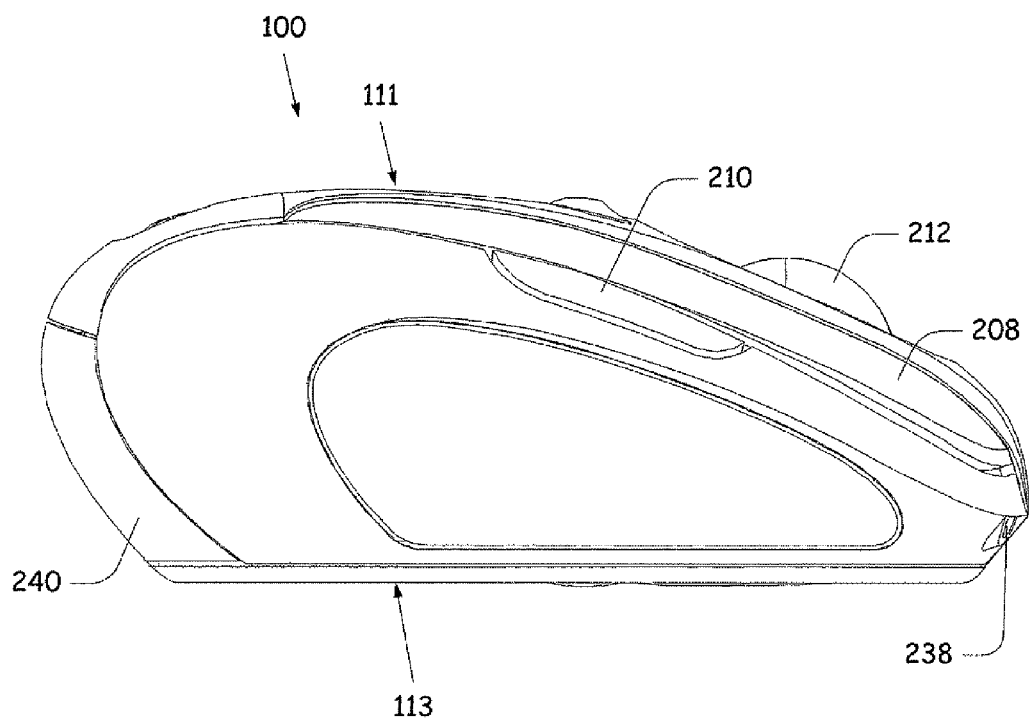
FIG. 4 is a side view of an input device.

FIGS. 2-4 illustrate different views of input device 100. Input device 100 includes top surface 111 (as seen in FIG. 2) and bottom surface 113 (as seen in FIG. 3). Positioned on top surface 111 are keys 110 that include a left side button 204, a left-click button 206, a right-click button 208 and a right side button 210. Top surface 111 also includes a scroll wheel 212 and a mode selection switch 214. Scroll wheel 212 can be used to scroll up/down as well as side/side. Keys 110 can be enabled in a mouse mode to operate as a conventional mouse.

Positioned on bottom surface 113 are buttons 220, 222, 224, 226, 228, and 230. Button 220 is illustrated as being larger than each of the other buttons 222, 224, 226, 228 and 230. During presentations, button 220 can be programmed to be used most frequently such as a next slide button. Additionally, button 224 can serve as a "home" button in the center of keys 112 such that a user can easily feel for button 224 without having to resort to looking at the keys 112. Keys 112 can be enabled in a presenter mode and can include several presentation functions. Button 220 can move a presentation to a next slide and button 228 can move the presentation to a previous slide. Button 224 can be used to operate laser 117 of FIG. 1. When button 224 is depressed, laser 117 outputs a beam through port 238.

Buttons 222, 226 and 230 can be used for media controls. In this case, button 222 serves as a volume up button, button 230 serves as a volume down button, and button 226 serves as a play/pause button. Alternatively, button 226 can serve as a blank screen button, which will turn a screen blank when depressed. It is worth noting that keys 110 (including buttons 204, 206, 208, 210 and wheel 212) and keys 112 (including buttons 220, 222, 224, 226, 228 and 230) can be programmed for any task as desired.

Additionally, surface 113 includes a power switch 232, a wireless transmission port 234, an optical sensor port 236 and a laser port 238. Input device 100 also includes a detachable portion 240 that can be released from input device 100 by actuating a release button 242. Detachable portion 240 can be removed from input device 100 to replace batteries, perform service and maintenance, etc.

Mode selection switch 214 is used to select a particular mode for which device 100 operates. Alternatively, or in addition to, mode selection can be performed automatically as a function of one or more conditions of input device 100. In one example, input device 100 can operate in a mouse mode and a presenter mode, although other modes can also be used. When in the mouse mode, surface 113 can rest on a flat surface such as a desk or table. In the presenter mode, device 100 can be held by a user wherein surface 113 is held upright and can be operated by a user's thumb.

In mouse mode, input device 100 operates as a standard mouse, in which keys 110 and position tracking sensor 116 are enabled. With reference also to FIG. 2, keys 110 can include buttons 204, 206, 208, 210 and wheel 212. Thus, a user has access to all keys 110 on surface 111. Keys 112 can be enabled at all times and be used to transition input device 100 to a presenter mode. When any one of keys 112 is depressed, input device 100 can switch to presenter mode automatically, where keys 110 and position tracking sensor 116 are disabled. Input device 100 can include a contour such that inadvertent pressing of one of keys 112 is prevented when input device is positioned on a surface and operating in the mouse mode.

Figure 5:
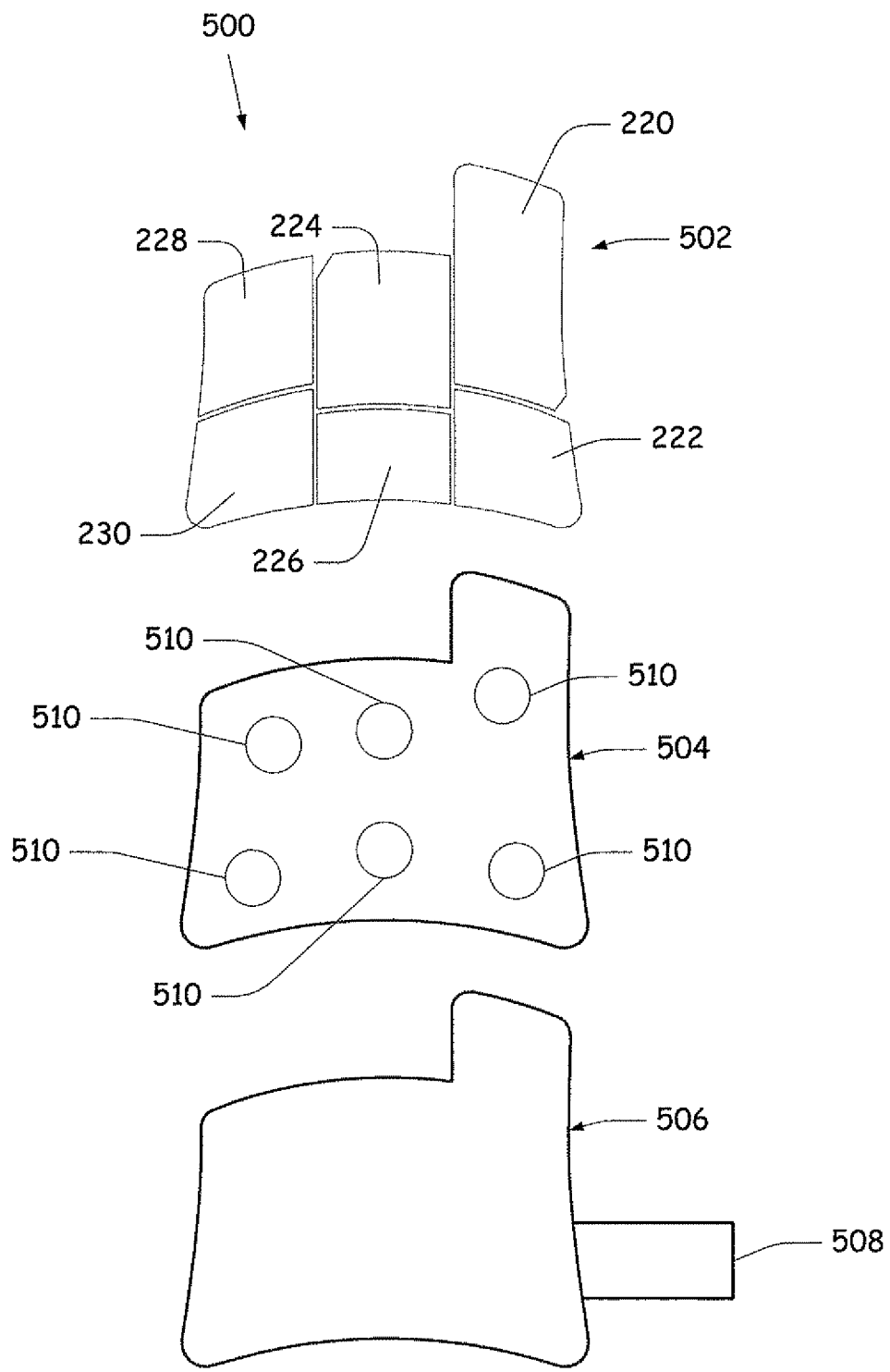
FIG. 5 is a view of a keypad for an input device.

As illustrated in FIG. 5, keys 112 can be integrated into a single keypad 500 that is coupled to a form factor of input device 100 and electrically coupled to processing module 104. Input device 100 can form a recess area to accommodate keypad 500. The recess can of sufficient depth to prevent inadvertent pressing of keys 112 in mouse mode yet still be accessible in presenter mode. Keypad 500 includes a pad 502, a matrix (herein a dome sheet) 504, an adhesive layer 506 and a connector 508. Pad 502 serves as a covering to dome sheet 504 and also indicates separate buttons 220, 222, 224, 226, 228 and 230. Dome sheet 504 carries dome contacts that includes switches 510 for each of the buttons. Dome sheet is electrically coupled to connector 508 such that dome sheet provides signals of actuation of any of the switches 510 along the connector 508. In one embodiment, connector 508 is a ribbon cable. Adhesive layer 506 secures keypad 500 to device 100. With reference also to FIG. 3, keys 112 can include buttons 220, 222, 224, 226, 228 and 230.

Figure 6:
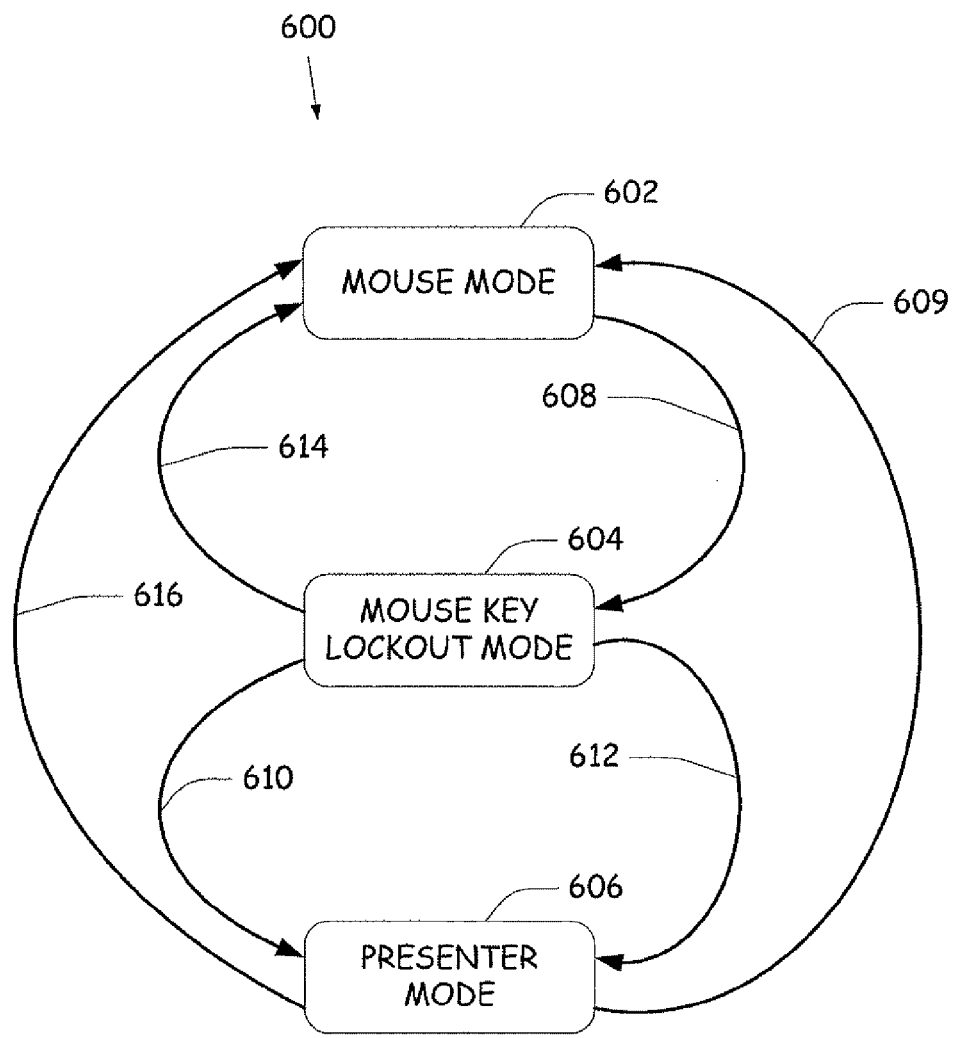
FIG. 6 is a state diagram of states for operation of an input device.

FIG. 6 is a state diagram of states for input device 100. State diagram 600 includes a mouse state 602 corresponding to a mouse mode, a mouse key lockout state 604 corresponding to a transition mode and a presenter state 606 corresponding to a presenter mode. When input device is powered on, input device begins at mouse state 602. In mouse state 602, all keys (i.e. keys 110 and 112) can be enabled. Alternatively, one or more of keys 112 can be disabled, but inadvertent pressing of keys 102 can be limited due to a shape of surface.

Depending on various conditions of input device 100, state diagram 600 shifts among states 600, 602 and 604. These conditions can relate to, for example, device 100 being positioned on/off a flat surface, a time that device 100 is off of a flat surface, a length of distance tracked by position tracking sensor 116 and/or whether particular keys on device 100 are pressed.

If it is detected that input device 100 is lifted off a surface, as indicated by arc 608, state diagram 600 shifts to mouse key lockout mode 604. These are several ways to detect whether device 100 is off a surface. For example, position tracking sensor 116, if optically based, can detect poor image quality since the tracking sensor 116 would not be able to detect strong reflections from a flat surface. Other sensors such as pressure sensors, capacitive sensors, tilt switches, etc. can also be used to detect whether device 100 is off of a surface. Additionally, pressing any of the keys 112 will automatically shift state diagram 600 from mouse state 602 to presenter state 606, as indicated by arc 609.

In mouse key lockout state 604, position tracking sensor 116 is still enabled and tracks a coordinate position for input device 100. Keys 110 are disabled and processing module 104 ignores any input from keys 110. There are two conditions for shifting state diagram 600 from state 604 to presenter state 606. If a presenter key is depressed, state diagram 600 immediately shifts to presenter mode 606 through arc 610.

If an off surface time period has been reached in mouse key lockout state 604, as represented by arc 612, state diagram 600 shifts to presenter state 606. For example, if position tracking sensor 116 still does not detect strong reflections after a period of time, it is likely that device 100 is being held by a presenter and device 100 can be shifted to a presenter mode.

State diagram 600 can shift from state 604 to state 602 along arc 614 if position tracking sensor only tracks a small movement of device 100. For example, a user may only temporarily shift device 100 to a new position while lifting the device 101 off a surface. In such a case, it is not necessary to transition to presenter mode 606 and thus state diagram 600 shifts from state 604 to state 602.

In presenter state 606, keys 110 enabled in the mouse mode are disabled. Thus, inadvertent pressing of keys 110 will not interfere with the presenter mode functions. State diagram 600 can shift from presenter state 606 to mouse state 602 via arc 616 in which position tracking sensor 116 senses a long position change of device 100. In such a case, a user is likely using device 100 in mouse mode and thus transition to mouse state 602 can be initiated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An input device, comprising:
  a form factor including a bottom surface adapted to be positioned in contact with a flat surface when the input device is positioned on the flat surface, and the form factor including a top surface opposite of the bottom surface;

a position tracking sensor configured to sense movement of the input device along the flat surface and provide a sensor output indicative of the input device being moved along the flat surface;

a first plurality of keys positioned on the top surface for use when the bottom surface is positioned on the flat surface;

a second plurality of keys for use when the bottom surface faces away from the flat surface, each of the second plurality of keys having a surface configured to be pressed by a user to actuate the key, the surface of the key being positioned proximate a plane defined along the bottom surface; and a processing module configured to operate the input device in a plurality of different operating modes comprising:
a first mode in which the first plurality of keys are enabled; and
a second mode in which at least some of the first plurality of keys are disabled and at least some of the second plurality of keys are enabled;

wherein the processing module is configured to determine whether the input device is positioned off of the flat surface based on data received from the position tracking sensor, and operate the input device in one of the plurality of operating modes based on the determination of whether the input device is positioned off of the flat surface.

2. The input device of claim 1 wherein the processing module is further configured to determine a time period that the input device is positioned off of the flat surface, compare the time period to a threshold value, and determine that the input device is positioned off of the flat surface based on the comparison of the time period to the threshold value.

3. The input device of claim 2 and further comprising:
a wireless transceiver operably coupled to the processing module to generate a wireless signal indicative of the signal.

4. The input device of claim 1 and further comprising a laser operably coupled to one of the second plurality of keys.

5. An input device, comprising:
a form factor including a bottom surface adapted to be positioned on a flat surface and a top surface opposite of the bottom surface;
a position tracking sensor configured to sense movement of the input device along the flat surface and provide a sensor output indicative of the input device being moved along the flat surface;
a plurality of mouse keys positioned on the top surface for use when the bottom surface is positioned on the flat surface;
a plurality of presenter keys positioned on the bottom surface for use when the bottom surface faces away from the flat surface, the plurality of presenter keys being configured to control presentation of media; and
a processing module configured to operate the input device in a plurality of different operating modes based on one or more conditions, the plurality of different operating modes comprising at least a first mouse mode in which the plurality of mouse keys are enabled and a second presenter mode in which at least some of the plurality of mouse keys are disabled and at least some of the plurality of presenter keys are enabled;
wherein the one or more conditions comprise a length of distance tracked by the position tracking sensor, and wherein the device is operated in one of the operating modes based on a comparison of the length to a threshold value.

6. The input device of claim 5, wherein the one or more conditions comprises the time period that the input device is off of the flat surface, and wherein the device is operated in one of the operating modes based on a comparison of the time period to a threshold value.

7. The input device of claim 5 and further comprising:
a wireless transceiver operably coupled to the processing module to generate a wireless signal indicative of the signal.

8. The input device of claim 5 wherein the plurality of presenter keys form a keypad that includes a matrix including a switch for each key in the plurality of presenter keys such that when one of the plurality of presenter keys is pressed, the corresponding switch is activated to provide a signal indicative thereof, wherein the form factor includes a recess to accommodate the matrix.

9. The input device of claim 5, and further comprising:
a light source configured to generate a beam of light to indicate points of interest; and
wherein at least one of the presenter keys positioned on the bottom surface is configured to control the light source.

10. The input device of claim 5, and further comprising:
a light source configured to generate a beam of light to indicate points of interest; and
wherein the light source is automatically enabled when the device is placed in the second mode.

11. The input device of claim 1, wherein the second plurality of keys are operably coupled to a matrix including a switch for each key in the second plurality of keys such that when one of the second plurality of keys is pressed, the corresponding switch is activated to provide a signal indicative thereof.

12. The input device of claim 11, wherein the matrix includes a dome sheet coupled to the second plurality of keys and the form factor includes a recess to accommodate the matrix.

13. The input device of claim 1, wherein the plurality of different operating modes comprises a third, transition mode for transitioning between the first and second modes based on one or more conditions of the input device.

14. The input device of claim 13, wherein, in the transition mode, the position tracking sensor is enabled to track a position of the input device and at least some of the first plurality of keys are disabled.

15. The input device of claim 13, wherein the processing module transitions from the transition mode to the second mode, if one of the second plurality of keys is pressed.

16. The input device of claim 13, wherein the processing module transitions from the first mode to the transition mode if the input device is lifted off of the flat surface, and then transitions from the transition mode back to the first mode if the position tracking sensor tracks movement of the input device that is below a threshold.

17. An input device, comprising:
a form factor including a bottom surface configured to be positioned on a flat surface when the input device is positioned on the flat surface, and the form factor including a top surface opposite of the bottom surface;
a position tracking sensor configured to sense movement of the input device along the flat surface and provide a sensor output indicative of the input device being moved along the flat surface;
a plurality of mouse keys positioned on the top surface for use when the bottom surface is positioned on the flat surface;
a plurality of presenter keys positioned on the bottom surface for use when the bottom surface faces away from the flat surface, the plurality of presenter keys being configured to control presentation of media;

a processing module configured to operate the input device in a plurality of different operating modes based on one or more conditions, the plurality of different operating modes comprising at least a first mouse mode in which the plurality of mouse keys are enabled and a second presenter mode in which at least some of the plurality of mouse keys are disabled and at least some of the plurality, of presenter keys are enabled;

wherein the one or more conditions comprises detecting that a particular key on the input device has been pressed, wherein the processing module is configured to detect that the input device is off of the flat surface, and to place the input device in the second presenter mode if the particular key has been pressed while the input device is off of the flat surface, and wherein the processing module detects that the input device is off the flat surface based on a signal from the position tracking sensor.

18. The input device of claim 17, wherein the particular key comprises one of the presenter keys positioned on the bottom surface.

\* \* \* \* \*